United States Patent
Beeler et al.

(10) Patent No.: US 11,875,441 B2
(45) Date of Patent: *Jan. 16, 2024

(54) DATA-DRIVEN EXTRACTION AND COMPOSITION OF SECONDARY DYNAMICS IN FACIAL PERFORMANCE CAPTURE

(71) Applicants: DISNEY ENTERPRISES, INC., Burbank, CA (US); ETH Zürich (Eidgenössische Technische Hochschule Zürich), Zürich (CH)

(72) Inventors: Dominik Thabo Beeler, Egg (CH); Derek Edward Bradley, Zurich (CH); Eftychios Dimitrios Sifakis, Verona, WI (US); Gaspard Zoss, Zurich (CH)

(73) Assignees: DISNEY ENTERPRISES, INC., Burbank, CA (US); ETH ZÜRICH (EIDGENÖSSISCHE TECHNISCHE HOCHSCHULE ZÜRICH), Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,782

(22) Filed: Oct. 11, 2022

(65) Prior Publication Data

US 2023/0065700 A1    Mar. 2, 2023

Related U.S. Application Data

(63) Continuation of application No. 16/702,471, filed on Dec. 3, 2019, now Pat. No. 11,587,276.

(51) Int. Cl.
*G06T 13/40* (2011.01)
*G06T 13/80* (2011.01)
(Continued)

(52) U.S. Cl.
CPC ............ *G06T 13/40* (2013.01); *G06F 18/214* (2023.01); *G06T 13/80* (2013.01); *G06V 40/176* (2022.01); *G06T 2215/06* (2013.01)

(58) Field of Classification Search
CPC ..... G06T 13/40; G06T 13/80; G06T 2215/16; G06V 40/176; G06V 2201/03
See application file for complete search history.

(56) References Cited

U.S. PATENT DOCUMENTS 8,437,506 B2    5/2013   Williams et al.
8,509,965 B2 *  8/2013   Lin ..................... G08G 5/0078
                                                340/961

(Continued)

OTHER PUBLICATIONS

Anguelov et al., "SCAPE: Shape Completion and Animation of People", https://doi.org/10.1145/1073204.1073207, ACM Transactions Graphis, vol. 24, No. 3, Jul. 2005, pp. 408-416.

(Continued)

*Primary Examiner* — Ming Wu
(74) *Attorney, Agent, or Firm* — Artegis Law Group, LLP

(57) ABSTRACT

A modeling engine generates a prediction model that quantifies and predicts secondary dynamics associated with the face of a performer enacting a performance. The modeling engine generates a set of geometric representations that represents the face of the performer enacting different facial expressions under a range of loading conditions. For a given facial expression and specific loading condition, the modeling engine trains a Machine Learning model to predict how soft tissue regions of the face of the performer change in response to external forces applied to the performer during the performance. The modeling engine combines different expression models associated with different facial expressions to generate a prediction model. The prediction model can be used to predict and remove secondary dynamics from a given geometric representation of a performance (Continued)

or to generate and add secondary dynamics to a given geometric representation of a performance.

20 Claims, 6 Drawing Sheets

(51) Int. Cl.
  *G06V 40/16* (2022.01)
  *G06F 18/214* (2023.01)

(56) References Cited

U.S. PATENT DOCUMENTS

| | | | |
|---|---|---|---|
| 9,082,222 | B2 | 7/2015 | Bickel et al. |
| 9,865,072 | B2* | 1/2018 | Beeler ............... G06V 40/176 |
| 10,198,845 | B1 | 2/2019 | Bhat et al. |
| 2009/0322895 | A1 | 12/2009 | Miyata |
| 2009/0327889 | A1 | 12/2009 | Jeong et al. |
| 2016/0361653 | A1 | 12/2016 | Zhang et al. |
| 2017/0024921 | A1 | 1/2017 | Beeler et al. |
| 2017/0091529 | A1* | 3/2017 | Beeler ............... G06T 7/246 |
| 2017/0337682 | A1* | 11/2017 | Liao ............... A61B 5/7267 |
| 2018/0174146 | A1 | 6/2018 | Bansal et al. |
| 2018/0174746 | A1 | 6/2018 | Ryu et al. |
| 2019/0266796 | A1 | 8/2019 | Comer |
| 2019/0313915 | A1 | 10/2019 | Tzvieli et al. |
| 2020/0134898 | A1 | 4/2020 | Sheth et al. |
| 2020/0191943 | A1 | 6/2020 | Wu et al. |
| 2021/0166366 | A1 | 6/2021 | Kong et al. |

OTHER PUBLICATIONS

Barrielle et al., "BlendForces: A Dynamic Framework for Facial Animation", DOI: 10.1111/cgf.12836, Computer Graphics Forum, vol. 35, No. 2, 2016, 12 pages.
Beeler et al., "High-Quality Passive Facial Performance Capture using Anchor Frames", http://doi.acm.org/10.1145/1964921.1964970, ACM Transactions on Graphics, vol. 30, No. 4, Article 75, Jul. 2011, 10 pages.
Bradley et al., "High Resolution Passive Facial Performance Capture", http://doi.acm.org/10.1145/1778765.1778778, ACM Transactions on Graphics, vol. 29, No. 4, Article 41, Jul. 2010, pp. 10 pages.
Capell et al., "Physically based Rigging for Deformable Characters", doi: 10.1016/j.gmod.2006.09.001, Graphical Models, Proceedings of the 2005 ACM SIGGRAPH/Eurographics Symposium on Computer Animation, vol. 69, No. 1, 2007, pp. 71-87.
Cong et al., "Art-Directed Muscle Simulation for High-End Facial Animation", Eurographics/ACM SIGGRAPH Symposium on Computer Animation, Retreived from http://physbam.stanford.edu/~mdcong/pdf/artist_directed_facial_simulation.pdf, 2016, 9 pages.
Aguiar et al., "Stable Spaces for Real-time Clothing", http://doi.acm.org/10.1145/1778765.1778843, ACM Transactions on Graphics, vol. 29, No. 4, Article 106, Jul. 2010, pp. 106:1-106:9.
Goes et al., "Regularized Kelvinlets: Sculpting Brushes based on Fundamental Solutions of Elasticity", DOI: http://dx.doi.org/10.1145/3072959.3073595, ACM Transactions on Graphics, vol. 36, No. 4, Article 40, Jul. 2017, pp. 10:1-40:11.
Fratarcangeli et al., "Fast Nonlinear Least Squares Optimization of Large-Scale Semi-Sparse Problems", DOI:10.1111/cgf.13927, Computer Graphics Forum {Proc. Eurographics), 2020, pp. 247-259.
Fyffe et al., "Comprehensive Facial Performance Capture", DOI:10.1111/j.1467-8659.2011.01888.x, EUROGRAPHICS 2011, vol. 30, No. 2, 2011, pp. 425-434.
Fyffe et al., "Multi-View Stereo on Consistent Face Topology", DOI: 10.1111/cgf.13127, Computer Graphics Form, vol. 36, No. 2, May 2017, pp. 295-309.
Garrido et al., "Reconstructing Detailed Dynamic Face Geometry from Monocular Video", https://doi.org/10.1145/2508363.2508380, ACM Transactions on Graphics, vol. 32, No. 6, Article 158, Nov. 2013, pp. 158:1-158:10.

Hahn et al., "Rig-Space Physics", http://doi.acm.org/10.1145/2185520.2185568, ACM Transactions on Graphics, vol. 31, No. 4, Article 72, Jul. 2012, 8 pages.
Hahn et al., "Efficient Simulation of Secondary Motion in Rig-Space", https//doi.org/10.1145/2485895.2485918, Proceedings of the 12th ACM SIGGRAPH/Eurographics Symposium on Computer Animation—SCA'13, Jul. 19-21, 2013, pp. 165-171.
Ichim et al., "Phace: Physics-based Face Modeling and Animation", DOI:http://dx.doi.org/10.1145/3072959.3073664, ACM Transactions on Graphics, vol. 36, No. 4, Article 153, Jul. 2017, pp. 153:1-153:14.
Ichim et al., "Building and Animating User-Specific Volumetric Face Rigs", DOI:10.2312/sca.20161228, Eurographics ACM SIGGRAPH Symposium on Computer Animation, 2016, 10 pages.
Kim et al., "Data-Driven Physics for Human Soft Tissue Animation", DOI: http://dx.doi.org/10.1145/3072959.3073685, ACM Transactions on Graphics, vol. 36, No. 4, Article 54, Jul. 2017, pp. 54:1-54:12.
Kingma et al., "Adam: A Method for Stochastic Optimization", arXiv:1412.6980v9, 2015, 15 pages.
Kozlov et al., "Enriching Facial Blendshape Rigs with Physical Simulation", DOI:10.1111/cgf.13108, computer Graphics Forum (Proc. Eurographics), vol. 36, No. 2, 2017, pp. 75-84.
Laine et al., "Production-Level Facial Performance Capture Using Deep Convolutional Neural Networks", https://doi.org/10.1145/3099564.3099581, In Proceedings of the ACM SIGGRAPH / Eurographics Symposium on Computer Animation, Jul. 28-30, 2017, 10 pages.
Loper et al., "SMPL: A Skinned Multi-Person Linear Model", https://doi.org/10.1145/2816 795.2818013, ACM Transactions on Graphics, vol. 34, No. 6, Article 248, Oct. 2015, 16 pages.
Park et al., "Capturing and Animating Skin Deformation in Human Motion", https//doi.org/10.1145/1179352.1141970, 2006, pp. 881-889.
Park et al., "Data-driven Modeling of Skin and Muscle Deformation", http://doi.acm.org/10.1145/1360612.1360695, ACM Transactions on Graphics, vol. 27, No. 3, Article 96, Aug. 2008, pp. 96:1-96:6.
Paszke et al., "PyTorch: An Imperative Style, High-Performance Deep Learning Library", 33rd Conference on Neural Information Processing Systems, 2019, 12 pages.
Pons-Moll et al., "Dyna: A Model of Dynamic Human Shape in Motion", vol. 34, 2015, 14 pages.
Santesteban et al., "SoftSMPL: Data-Driven Modeling of Nonlinear Soll-tissue Dynamics for Parametric Humans", Computer Graphics Forum, Proc. Eurographics, vol. 39, No. 2, 2020, 11 pages.
Shi et al., "Automatic Acquisition of High-fidelity Facial Performances Using Monocular Videos", DOI: http://doi.acm.27.org/10.1145/2661229.2661290, ACM Transactions on Graphics {Proceedings of SIGGRAPH Asia 2014), vol. 33, No. 5, Article 222, Nov. 2014, pp. 222:1-222:13.
Sifakis et al., "Simulating Speech with a Physics-Based Facial Muscle Model", Eurographics/ACM SIGGRAPH Symposium on Computer Animation, 2006, pp. 261-270.
Sorkine et al., "Laplacian Surface Editing", Eurographics Symposium on Geometry Processing, 2014, pp. 175-184.
Suwajanakorn et al., "Total Moving Face Reconstruction", In ECCV (4) {Lecture Notes in Computer Science), vol. 8692, 2014, pp. 796-812.
Tewari et al., "MoFA: Model-based Deep Convolutional Face Autoencoder for Unsupervised Monocular Reconstruction", In Proc. of IEEE ICCV, 2017, pp. 1274-1283.
Wu et al., "An Anatomically-Constrained Local Deformation Model for Monocular Face Capture", DOI=10.1145/2897824.2925882 http://doi.acm.org/10.1145/2897824.2925882, ACM Trans. Graph., vol. 35, No. 4, Article 115, Jul. 2016, pp. 115:1-115:12.
Xu et al., "Pose-Space Subspace Dynamics", DOI: http://dx.doi.org/10.1145/2897824.2925916, ACM Transactions Graphics, vol. 35, No. 4, Article 35, Jul. 2016, pp. 35:1-35:14.
Xu et al., "Example-Based Damping Design", DOI: http://dx.doi.org/10.1145/3072959.3073631, ACM Transactions on Graphics, vol. 36, No. 4, Article 53, Jul. 2017, pp. 53:1-53:14.

(56) References Cited

OTHER PUBLICATIONS

Agarwal et al., "Ceres Solver", URL: http://ceres-solver.org, 2016, 2 pages.

King, Davis E., "Dlib-ml: A Machine Learning Toolkit", Journal of Machine Learning Research, vol. 10, Jul. 2009, pp. 1755-1758.

Weise et al., "Realtime Performance-based Facial Animation", ACM transactions on graphics (TOG), vol. 30 No. 4, Jul. 1-10, 2011, 10 pages.

Maguinness et al., "Non-rigid, but not rigid, Motion Interferes with the Processing of Structural Face Information in Developmental Prosopagnosia", Neuropsychologia, 70, 281-295, Feb. 11, 2015, 15 pages.

Notice of Allowance received for U.S. Appl. No. 16/702,471 dated Oct. 13, 2022, 14 pages.

Google Search, "Generate Facial with External Forces in the Rigid Portion of the Area", Retrieved on Oct. 7, 2022, 2 pages.

\* cited by examiner

DATA-DRIVEN EXTRACTION AND COMPOSITION OF SECONDARY DYNAMICS IN FACIAL PERFORMANCE CAPTURE

CROSS-REFERENCE TO RELATED APPLICATIONS

This application is a continuation of U.S. application Ser. No. 16/702,471, titled "DATA-DRIVEN EXTRACTION AND COMPOSITION OF SECONDARY DYNAMICS IN FACIAL PERFORMANCE CAPTURE," filed on Dec. 3, 2019, the subject matter of which is incorporated by reference herein in its entirety.

BACKGROUND

Field of the Various Embodiments

The various embodiments relate generally to computer science and computer animation and, more specifically, to data-driven extraction and composition of secondary dynamics in facial performance capture.

Description of the Related Art

Certain types of computer animation pipelines include a motion capture phase and a digital rendering phase. During the motion capture phase, a human performer enacts a performance within a motion capture environment. The motion capture environment typically includes multiple video cameras that are positioned at different angles relative to the performer and are configured to capture three-dimensional (3D) motion capture data as the performer enacts the performance. Subsequently, during the digital rendering phase, digital rendering techniques are used to process the 3D motion capture data to generate a 3D geometric model of the performer enacting the performance. A computer animation of the performance is then rendered based on the 3D geometric model.

Computer animation pipelines also can be implemented to generate computer animations representing the faces of digital characters exhibiting various facial expressions. For example, the motion capture phase of a computer animation pipeline could be implemented to generate 3D motion capture data representing a performer enacting a sequence of facial expressions during a performance. Subsequently, the digital rendering phase of the computer animation pipeline could be implemented to generate a 3D geometric model of the performer enacting the sequence of facial expressions. A computer animation of the sequence of facial expression could then be rendered based on the 3D geometric model. However, certain technical problems can arise when generating computer animations of facial expressions using 3D motion capture data.

In particular, during a given performance, the facial expressions of a performer usually include both primary dynamics that are derived from the performer enacting a given facial expression and secondary dynamics that are derived from one or more external forces. For example, suppose a performer smiles while jumping up and down on the ground. The facial expression of the performer would include primary dynamics associated with the act of smiling, but also would include secondary dynamics caused by the impact of the performer with the ground. In this example, the face of the performer could appear to jiggle upon each impact with the ground. When facial expressions include both primary and secondary dynamics, a computer animation of those facial expressions also includes the primary and secondary dynamics. In many situations, though, the secondary dynamics disrupt how realistically computer animations represent facial expressions. Accordingly, various techniques have been developed to mitigate secondary dynamics in computer animations.

One approach to mitigating secondary dynamics in a computer animation is to create a kinetic model of the face of a performer and subsequently use the kinetic model to simulate the secondary dynamics that arise during a given performance. Based on the resulting kinematic model, the secondary dynamics can then be removed from the facial expressions of the performer in the computer animation of the performance. Notably, however, kinetic models of human faces are usually quite inaccurate due to the large number of different interconnected tissues present in a typical human face and the large variances in material properties of those tissues. Further, viewers are typically visually sensitive to human faces and, therefore, can easily discern unrealistic computer animations of human faces. Consequently, even the most accurate kinetic models of human faces usually are not accurate enough to create computer animations of facial expressions that appear realistic to most viewers.

As the foregoing illustrates, what is needed in the art are more effective techniques for removing secondary dynamics from facial expressions in computer animations.

SUMMARY

Various embodiments include a computer-implemented method for generating computer animations of facial expressions, including generating a first geometric model of a first facial expression made by a performer during a performance, wherein the first geometric model includes a first level of secondary dynamics, generating a first set of values that correspond to one or more non-rigid portions of a facial area associated with the performer based on a second set of values that correspond to one or more rigid portions of the facial area, correcting the first geometric model based on the first set of values to generate a second geometric model that includes a second level of secondary dynamics, and generating a computer animation that is based on the second geometric model and depicts the first facial expression having the second level of secondary dynamics.

At least one technical advantage of the disclosed techniques relative to the prior art is that the disclosed techniques enable the secondary dynamics associated with the facial expressions made by a performer during a performance to be accurately predicted. Accordingly, the secondary dynamics can be reduced or eliminated in a computer animation of those facial expressions in a more accurate manner relative to prior art approaches, thus resulting in an overall more realistic looking computer animation.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive con

DETAILED DESCRIPTION

Figure 1:
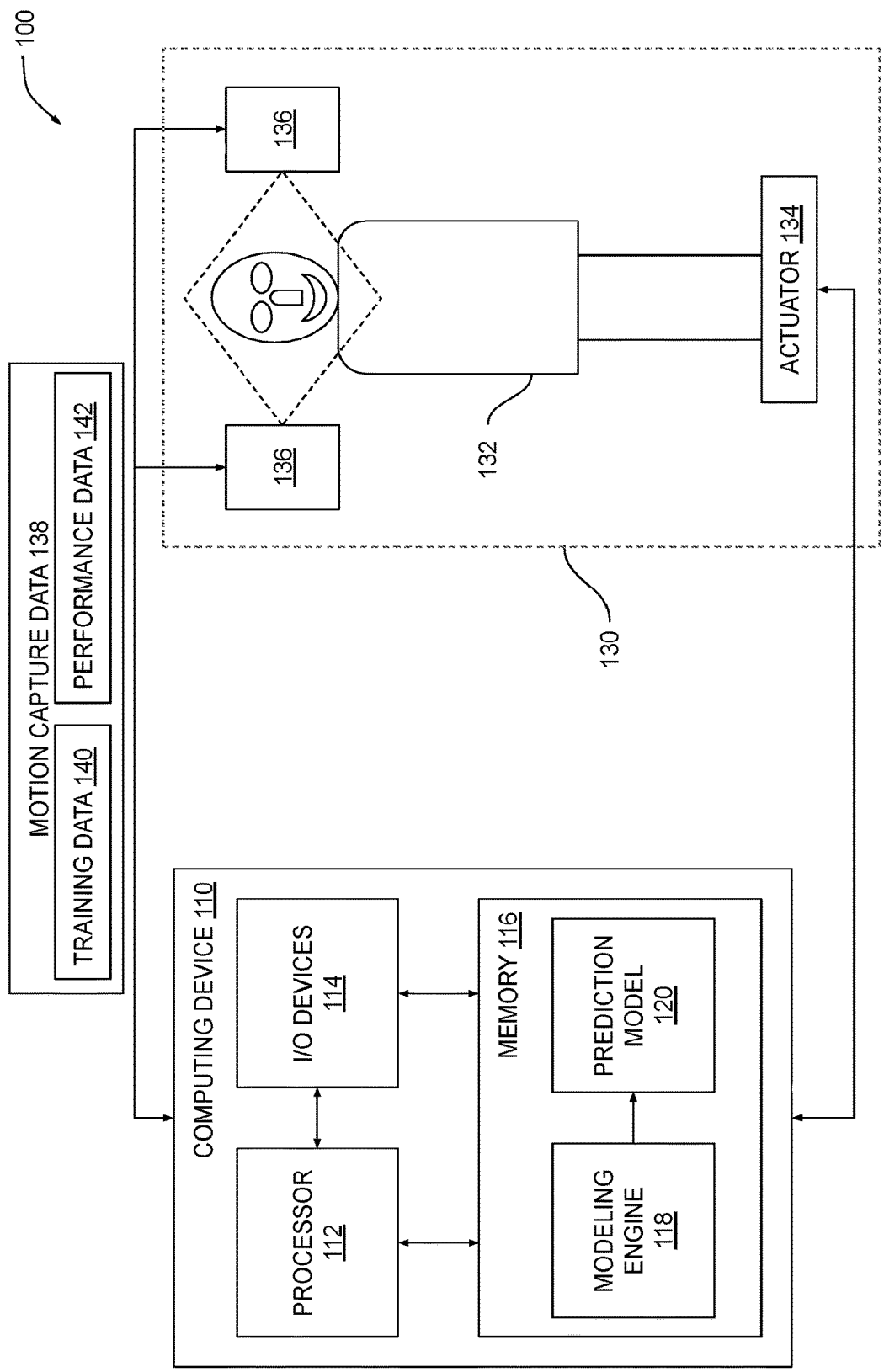
- FIG. 1 illustrates a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, during a given performance, the facial expressions of a performer typically include both primary and secondary dynamics, thereby causing a computer animation generated based on the given performance to also include both primary and secondary dynamics. In many situations, though, the secondary dynamics interfere with the primary dynamics and disrupt how realistically the computer animation can represent specific facial expressions. As such, certain techniques have been developed to mitigate secondary dynamics in computer animations.

In particular, kinetic models have been developed to represent the faces of performers in order to simulate secondary dynamics that occur during performances. However, kinetic models are usually inaccurate due to the large number of different interconnected tissues present in the typical human face and large variances in material properties of those tissues. To compound this issue, viewers are usually visually sensitive to human faces and can therefore easily discern unrealistic computer animations of human faces. Consequently, even the most accurate kinetic models of human faces usually are not accurate enough to create computer animations of facial expressions that appear realistic to most viewers.

To address these issues, various embodiments include a modeling engine that generates a prediction model configured to quantify and predict secondary dynamics associated with a performer enacting a performance. Via a motion capture environment, the modeling engine captures performance data that reflects the performer enacting the performance. The modeling engine processes the performance data to construct a set of geometric representations.

The set of geometric representations generally represents the face of the performer enacting different facial expressions during the performance under a range of loading conditions designed to induce secondary dynamics of different magnitudes. A given loading condition could be, for example, a forced oscillation that is physically imparted to the performer. The set of geometric representations also represents the face of the performer enacting the different facial expressions in the absence of any specific loading conditions. For a given facial expression and specific loading condition, the modeling engine analyzes a corresponding geometric representation to identify a set of rigid points that correspond to skeletal regions of the performer. The modeling engine tracks the positions of these rigid points over time to generate a velocity history for each rigid point. The modeling engine also analyzes the geometric representation to identify a set of non-rigid points that correspond to non-skeletal regions of the performer, including soft tissue areas that exhibit secondary dynamics when the performer enacts the given facial expression under the loading condition. The modeling engine compares the positions of the non-rigid points during the specific loading condition to corresponding positions of those non-rigid points in the absence of the specific loading condition, thereby generating a set of delta values. The delta value associated with a given non-rigid point is derived from secondary dynamics induced by the loading condition.

Based on the velocity history generated for the set of rigid points and the delta values generated for the set of non-rigid points, the modeling engine trains an expression model to generate the set of delta values based on the velocity history. In practice, the expression model includes a different support vector regressor for each X, Y, and Z dimension associated with each non-rigid point, although any technically feasible type of Machine Learning model can also be implemented.

The modeling engine repeats the above techniques for one or more facial expressions under one or more different loading conditions to generate a different expression model for each facial expression. For a given facial expression, a given expression model can predict the secondary dynamics associated with the corresponding non-rigid points based on velocity histories of the associated rigid points.

The modeling engine computes a weighted sum of the different expression models to generate the prediction model. In doing so, the modeling engine generates a set of blendshapes that can represent some or all of the geometric representations (or any combination thereof). The modeling engine assigns a weight to each blendshape to produce a set of blendshape weights. The modeling engine maps the set of blendshape weights to a set of expression model weights and then computes the weighted sum of the different expression models using the set of expression model weights. The resultant prediction model is broadly applicable across a range of expressions that includes, but is not limited to, the specific expressions associated with the performance. The prediction model can be used to predict and remove secondary dynamics from a given geometric representation of a performance or generate and add secondary dynamics to a given geometric representation of a performance.

At least one technical advantage of the disclosed techniques relative to the prior art is that the disclosed techniques enable the secondary dynamics associated with the facial expressions made by a performer during a performance to be accurately predicted. Accordingly, the secondary dynamics can be reduced or eliminated in a computer animation of those facial expressions in a more accurate manner relative to prior art approaches, thus resulting in an overall more realistic looking computer animation. These technical advantages represent one or more technological advancements over prior art approaches.

System Overview

FIG. 1 illustrates a system configured to implement one or more aspects of the various embodiments. As shown, a system 100 includes a computing device 110 and a motion capture environment 130. Computing device 110 may be any technically feasible type of computer system, including a desktop computer, a laptop computer, a mobile device, a virtualized instance of a computing device, a distributed and/or cloud-based computer system, and so forth. Motion capture environment 130 may be any technically feasible setup for capturing and/or recording the physical motions of one or more subjects, including a film studio, a motion capture studio, a chroma key compositing screen, and so forth.

Computing device 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs) or one or more graphics processing units (GPUs). I/O devices 114 include any technically feasible set of devices configured to perform input and/or output operations, including, for example, a display device, a keyboard, a mouse, or a touchscreen, among others. Memory 116 includes any technically feasible storage media configured to store data and software applications, such as, for example, a hard disk, a random-access memory (RAM) module, and a read-only memory (ROM). Memory 116 includes a modeling engine 118 and a prediction model 120, described in greater detail below.

Motion capture environment 130 includes capture devices 136 that implement one or more motion capture operations relative to a set of facial expressions enacted by a performer 132 during a performance. In one embodiment, motion capture environment 130 may include an actuator 134 on which performer 132 stands during the performance. Actuator 134 may impart oscillatory loads to performer 132 in order to simulate different loading conditions. Each loading condition may induce different secondary dynamics in the face of performer 132 during the performance. Performer 132 can also be subject to various other types of loading conditions and/or actuation that induces secondary dynamics during the performance. Performer 132 may also perform various actions that cause secondary dynamics to occur, such as moving, jumping, and so forth within motion capture environment 130. Capture devices 136 are configured to record motion capture data 138 and to transmit motion capture data 138 to modeling engine 118. Motion capture data 138 includes high resolution 3D optical data that depicts the face of performer 132 over a time interval. Performance data 138 includes training data 140 that depicts performer 132 enacting the set of facial expressions. Training data 140 is used to train modeling engine 118, as described below in conjunction with FIG. 2A. Motion capture data 138 also includes performance data 142 that is processed by modeling engine 118, once training is complete, to remove secondary dynamics, as described below in conjunction with FIG. 2B.

In embodiments where actuator 134 is implemented, modeling engine 118 commands actuator 134 to actuate performer 132 across a range of oscillation speeds between a zero actuation speed and a maximum actuation speed while performer 132 enacts each different facial expression. For a given facial expression, modeling engine 118 captures training data 140 that represents a range of potential secondary dynamics that can occur during enactment of the given facial expression. At zero actuation speed, training data 140 indicates a baseline facial expression that can be used for comparison purposes in order to quantify the effects of higher actuation speeds.

Modeling engine 118 is configured to analyze training data 140 in order to generate prediction model 120. Prediction model 120 is a data-driven model that can be used to predict the secondary dynamics that should occur within the face of performer 132 under various conditions. Modeling engine 118 generates prediction model 120 by training a set of Machine Learning models to map skeletal dynamics of performer 132 to soft tissue dynamics of performer 132 based on training data 140. Prediction model 120 can be used to remove secondary dynamics from a geometrical representation of the face of performer 132 derived from performance data 142 in order to facilitate the rendering of more realistic computer animations. Prediction model 120 can also be used to add secondary dynamics into the geometrical representation of the face of performer 132, as needed, in order to facilitate the rendering of more realistic computer animations. Modeling engine 118 is described in greater detail below in conjunction with FIGS. 2A-2B.

Software Overview

Figure 2A:
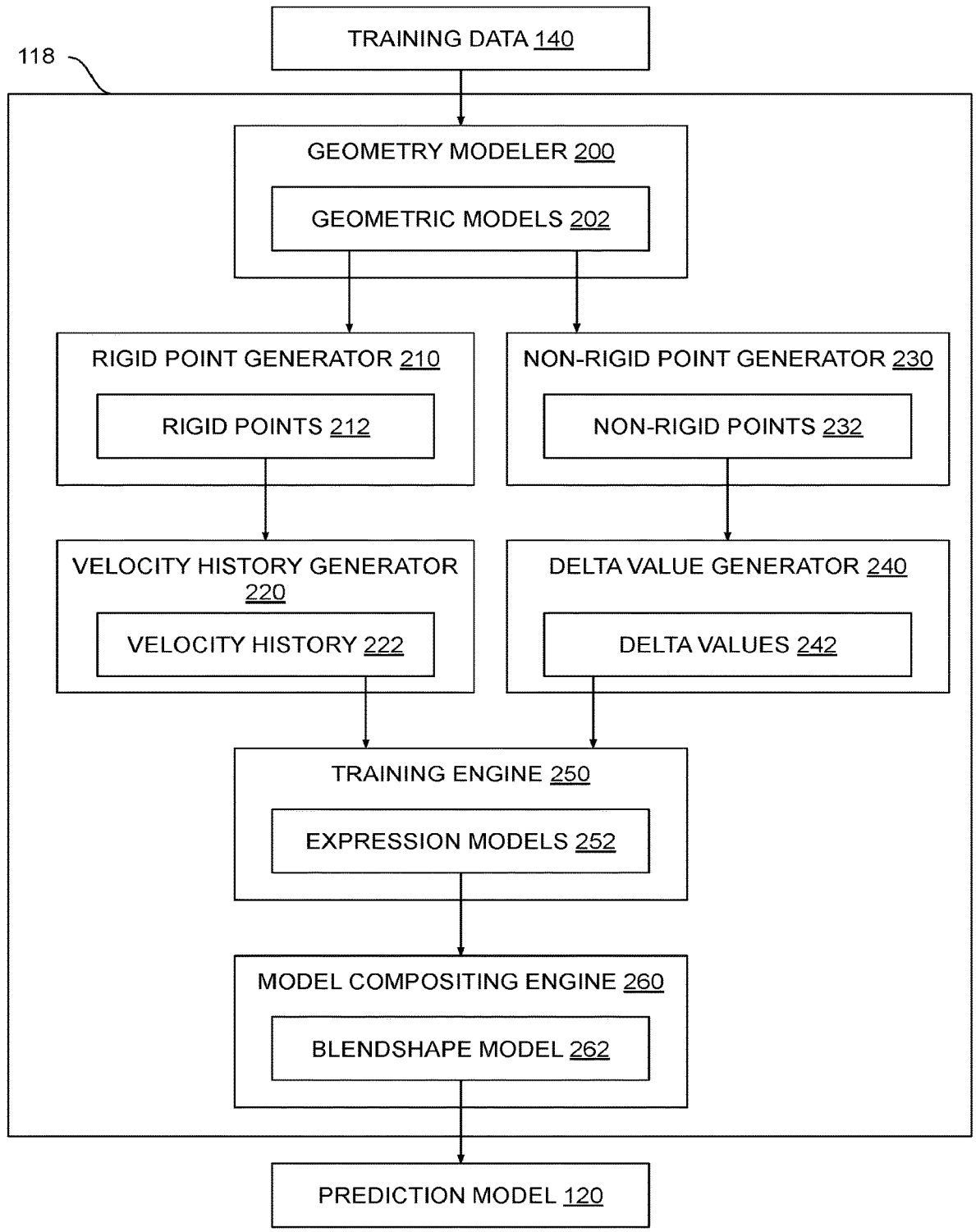
FIGS. 2A-2B set forth more detailed illustrations of the modeling engine of FIG. 1, according to various embodiments.
Figure 2B:
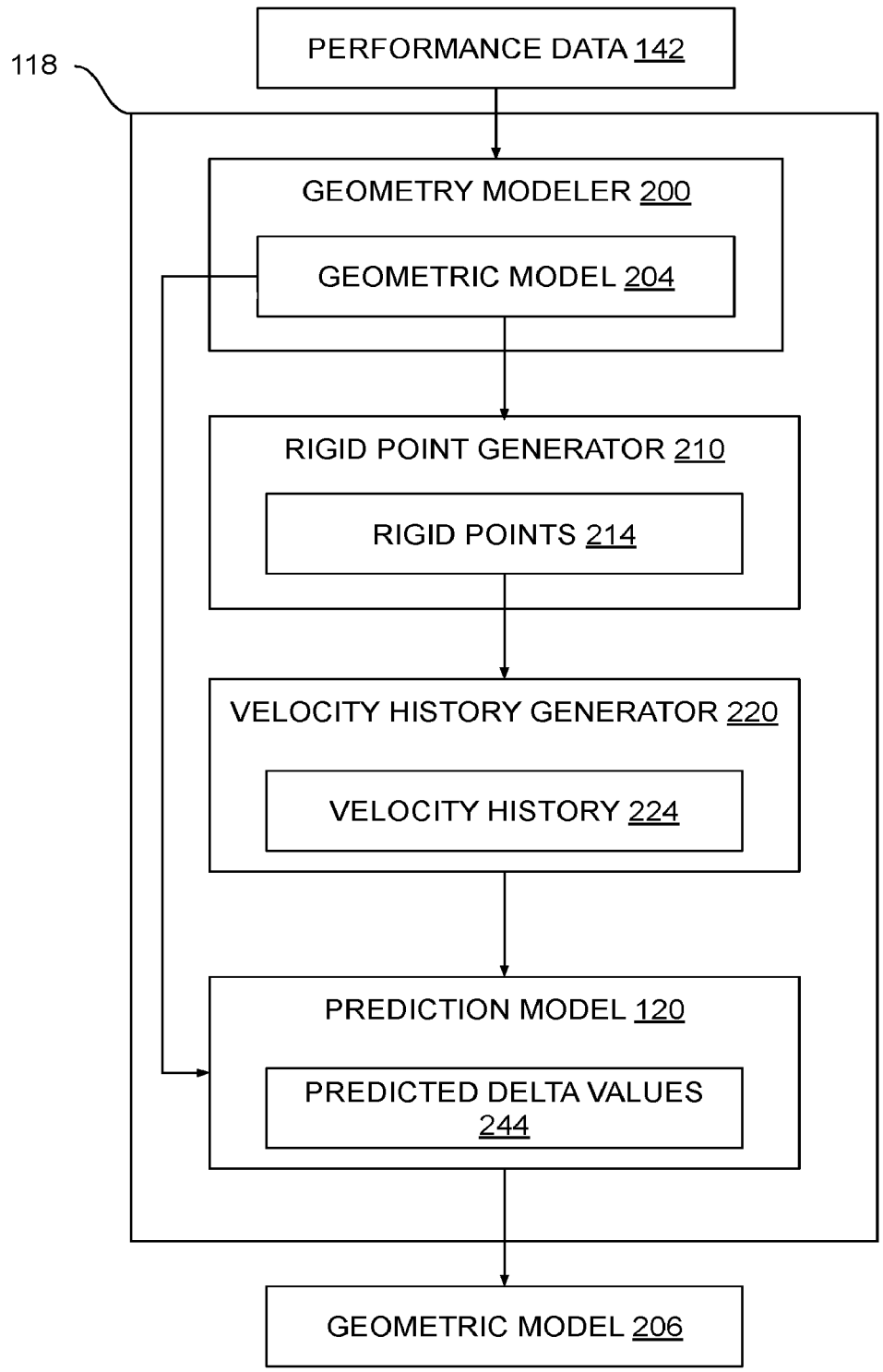

FIGS. 2A-2B set forth a more detailed illustration of the modeling engine of FIG. 1, according to various embodiments. Various data and modules that modeling engine 118 implements during a training phase of operation are shown in FIG. 2A, while various data and modules that modeling engine 118 implements during a prediction phase of operation are shown in FIG. 2B.

As shown in FIG. 2A, modeling engine 118 includes a geometry modeler 200, a rigid point generator 210, a velocity history generator 220, a non-rigid point generator 230, a delta value generator 240, a training engine 250, and a model compositing engine 260.

During a training phase of operation, geometry modeler 200 obtains training data 140 from motion capture environment 130 of FIG. 1. Training data 140 includes 3D motion capture data representing one or more facial expressions that performer 132 enacts during a training phase of operation. Training data 140 can be divided into different portions, where each portion includes 3D motion capture data recorded while performer 132 enacts a specific facial expression under a range of loading conditions. Geometry modeler 200 is configured to process training data 140 to generate one or more geometric models 202 corresponding to each of the different facial expressions. For a given facial expression, geometry modeler 200 generates a default geometric model 202 that represents the performer 132 enacting the given facial expression without actuation. Geometry modeler 200 also generates at least one other geometric model 202 for the given facial expression that represents the performer 132 enacting the given facial expression with actuation. Each geometric model 202 generally includes a 3D representation of the face of performer 132 over time and could include, for example, a time-varying triangulated mesh, a 3D point cloud, and so forth.

Rigid point generator 210 analyzes the different geometric models 202 associated with a given facial expression to generate rigid points 212. Rigid points 212 include a set of 3D locations on the surfaces of those geometric models 202 that correspond to rigid portions of the face of performer 132, including the underlying bone and/or skull of performer 132. A given portion of the face of performer 132 can be determined to be rigid when that portion moves in synchrony with the head of performer 132, but does not move significantly (e.g., less than a threshold level of movement)

when performer 132 enacts different facial expressions. Typically, these rigid portions correspond to skull regions of performer 132.

Velocity history generator 220 processes rigid points 212 to generate velocity history 222. Velocity history 222 indicates, for any given rigid point 212, the velocity of the given rigid point 212 at each time over a time interval via a 3D velocity vector. Velocity history generator 220 generates velocity history 222 by tracking the positions of each rigid point 212 over a sequence of times, computing the velocities of each rigid point 212 between adjacent times, and collecting some or all of those velocities.

In conjunction with or in parallel with rigid point generator 210 generating rigid points 212, non-rigid point generator 230 analyzes the different geometric models 202 associated with a given facial expression to generate non-rigid points 232. Non-rigid points 232 include a set of 3D locations on the surfaces of one or more geometric models 202 that correspond to non-rigid portions of the face of performer 132. A given portion of the face of performer 132 is determined to be non-rigid when that portion does not necessarily move in synchrony with the head of performer 132, but does move significantly (e.g., greater than a threshold level of movement) when performer 132 enacts different facial expressions. The non-rigid portions of performer 132 usually correspond to soft tissue regions of performer 132, such as the cheek or mouth areas, eyeballs and/or eyelids, and so forth.

Delta value generator 240 processes non-rigid points 232 to generate delta values 242. Delta values 242 indicate, for any given non-rigid point 232, how the 3D position of the non-rigid point 232 changes between a default geometric model 202 generated in the absence of actuation and one or more other geometric models 202 generated in the presence of actuation. As such, delta values 242 quantify the effects of secondary dynamics on the non-rigid portions of the face of performer 132. In one embodiment, delta value generator 240 generates a separate set of delta values for each frame of data included in motion capture data 138.

Training engine 250 performs a Machine Learning training operation based on velocity history 222 and delta values 242 to generate one or more expression models 252. A given expression model 252 generally corresponds to a specific facial expression and can be used to predict delta values 242 associated with that facial expression based on a corresponding velocity history 222. Each expression model 252 can quantify the level of secondary dynamics associated with non-rigid points 232 and, correspondingly, the non-rigid portions of the face of performer 132. In practice, the number of non-rigid points 232 exceeds the number of rigid points 212. As such, a given expression model 252 can be configured to predict multiple delta values 242 based on the velocity history 222 associated with at least one rigid point 212. In one embodiment, each expression model 252 may be a Machine Learning model that includes a different support vector regressor for each X, Y, and Z dimension associated with any given non-rigid point 232 and/or corresponding delta value 242. A given support vector regressor, once trained, may predict an X, Y, or Z component of the corresponding delta value 242 based on a particular X, Y, or Z component of a corresponding velocity history 222.

Compositing engine 260 computes a weighted combination of the various expression models 252 based on a blendshape model 262 to generate prediction model 120. Compositing engine 260 generates blendshape model 262 based on geometric models 202 in order to represent those geometric models 202 (or a combination thereof) using a set of blendshapes and corresponding blendshape weights. The set of blendshapes may include region-based blendshapes. Compositing engine 260 may implement any technically feasible approach when generating blendshape model 262, including conventional techniques for generating blendshapes and blendshape weights. Compositing engine 260 can use the blendshape weights directly to compute the weighted combination of expression models 252 when generating prediction model 120. However, this approach can lead to various inaccuracies. Thus, in practice, compositing engine 260 maps the blendshape weights to a set of expression model weights which are then used to compute the weighted combination. In one embodiment, compositing engine 260 may map the blendshape weights to expression model weights by constraining the blendshape weights and undetermined expression model weights to covariant subspaces using a set of transformation matrices, and then optimizing a cost function of these transformation matrices to derive values for the expression weights.

Prediction model 120 can predict secondary dynamics associated with a range of different facial expressions under a range of different conditions, thereby providing a robust mechanism for determining secondary dynamics that can be applied to both remove secondary dynamics where undesirable and add secondary dynamics when needed, as also discussed below in conjunction with FIG. 2B.

As shown in FIG. 2B, during a prediction phase of operation, geometry modeler 200 obtains performance data 142 that is captured while performer 132 enacts one or more facial expressions. The one or more facial expressions may include secondary dynamics that need modification. Based on performance data 142, geometry modeler 200 generates a geometric model 204 that includes a 3D representation of performer 132 enacting the one or more facial expressions over time. Rigid point generator 210 generates rigid points 214 based on geometric model 204 to track rigid and/or skull portions of performer 132 over time. Velocity history generator 220 generates velocity history 224 in like fashion as described above in conjunction with FIG. 2A. Accordingly, velocity history 224 reflects the velocity of a given rigid point 214 at each time over a time interval. Based on velocity history 224, prediction model 120 generates predicted delta values 244. Predicted delta values 244 quantify the level of secondary dynamics within the one or more facial expressions. Based on predicted delta values 244, prediction model 120 can modify geometric model 204 to generate geometric model 206. Geometric model 206 may include reduced secondary dynamics. Prediction model 120 can also be used to add secondary dynamics into geometric model 204 as needed.

Exemplary Generation of a Prediction Model

Figure 3:
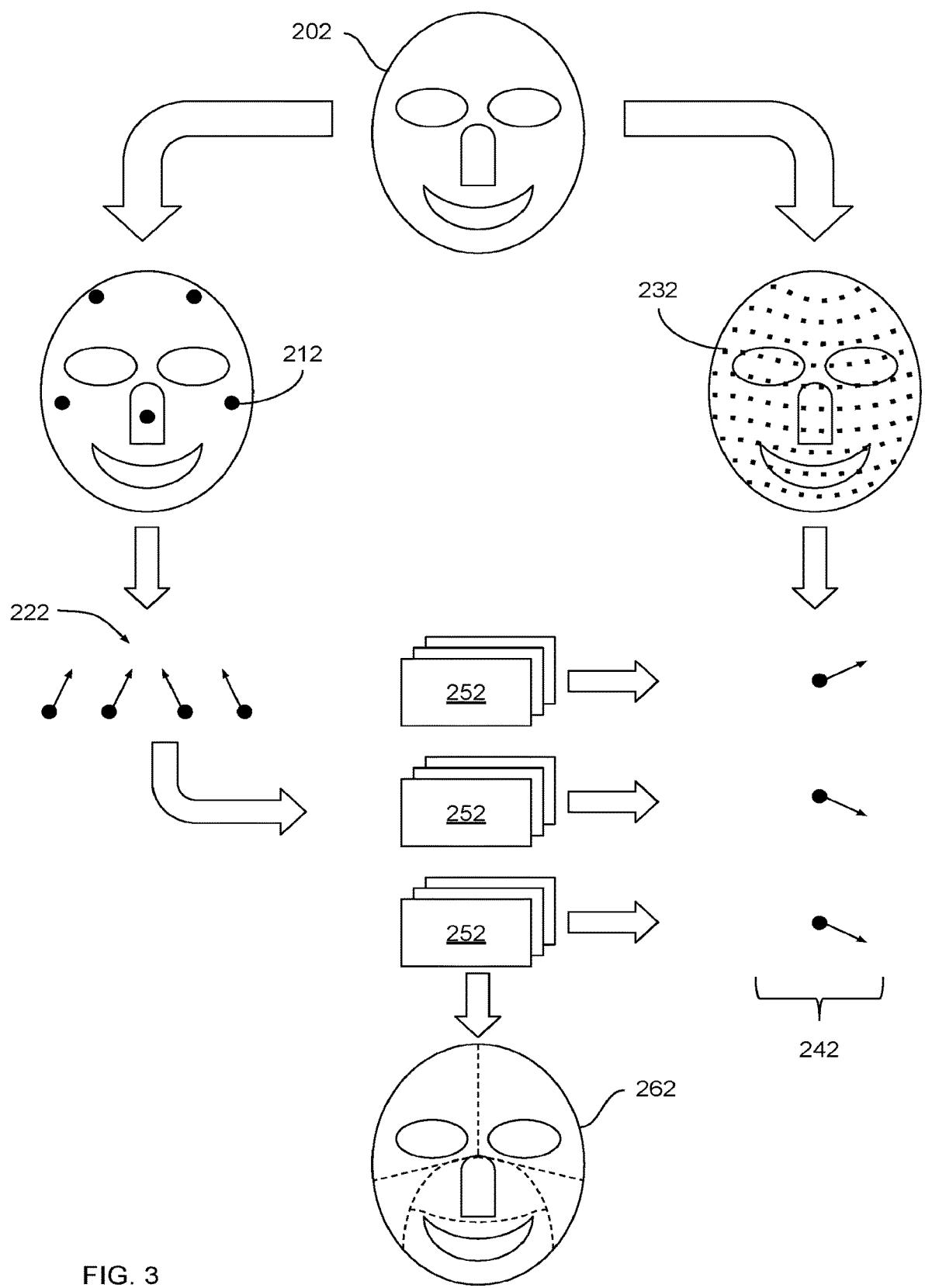
FIG. 3 illustrates how the modeling engine of FIG. 1 generates a prediction model for predicting secondary dynamics, according to various embodiments.

FIG. 3 illustrates how the modeling engine of FIG. 1 generates a prediction model for predicting secondary dynamics, according to various embodiments. As shown, modeling engine 118 initially generates a set of geometric models 202 that represent the different facial expressions performer 132 enacts during a performance. A given geometric model 202 can be a triangulated mesh or other type of 3D geometry configured to represent a time-varying 3D surface. Modeling engine 118 generates a default geometric model 202 for any given facial expression as well as one or more additional geometry models 202 that represent the given facial expression when performs 132 is subject to actuations that induce secondary dynamics.

Based on a given geometric model 202, modeling engine 118 generates a corresponding set of rigid points 212. As is shown, a set of rigid points 212 is sparsely distributed across a corresponding geometric model 202. Each rigid point 212 resides at a location that corresponds to rigid portions of the face of performer 132, such as skeletal regions or regions of the face of performer 132 that do not exhibit a high degree of secondary dynamics. In one embodiment, modeling engine 118 may determine rigid points 212 by selecting one or more vertices of a given geometric model 212. In another embodiment, modeling engine 118 may determine rigid points 212 by identifying specific facial features associated with a given geometric model 202 and then generating each rigid point 212 to reside at a specific location relative to the identified facial features. Modeling engine 118 is configured to generate velocity history 222 for any given set of rigid points 212 by tracking the position of those rigid points over time, as discussed above in conjunction with FIG. 2.

Based on geometric models 202, modeling engine 118 also generates non-rigid points 232. As is shown, a set of non-rigid points 232 is densely distributed across a corresponding geometric model 202. Each non-rigid point 232 resides at a location that corresponds to non-rigid portions of the face of performer 132, such as regions of facial tissue that are soft and/or flexible and can exhibit secondary dynamics. The term "facial tissue" generally refers to fat, musculature, and other tissues associated with the face. In one embodiment, modeling engine 118 may determine non-rigid points 232 by selecting one or more vertices of a given geometric model 202. In another embodiment, modeling engine 118 may determine non-rigid points 232 by interpolating a set of positions between adjacent rigid points 212. Modeling engine 118 is configured to generate delta values 242 for a set of non-rigid points 232 associated with a geometric model 202 based on a comparison with a set of non-rigid points 232 generated for a default geometric model 202, as discussed above in conjunction with FIG. 2.

Modeling engine 118 trains a plurality of expression models 252 to predict the delta values 242 associated with a set of non-rigid points 232 based on the velocity history 222 associated with a given rigid point 212. Because the number of non-rigid points 232 exceeds the number of rigid points 212, modeling engine 118 groups together different subsets of non-rigid points 232 and assigns each subset of non-rigid points 232 to be predicted based on a different rigid point 212. In addition, for any given non-rigid point 232, modeling engine 118 can train a different expression model 252 to predict the delta value 242 for a given X, Y, or Z dimension. As such, modeling engine 118 can train three different expression models 252 to predict the three different dimensions for any given delta value 242. Once trained in this manner, expression models 252 can collectively predict the secondary dynamics associated with a given facial expression.

Modeling engine 118 combines the different expression models 252 in order to generate prediction model 120. In one embodiment, modeling engine 118 may combine two expression models 252 by combining the outputs of those two expression models. Prediction model 120 is configured to predict secondary dynamics across a range of combinations of facial expressions. Modeling engine 118 computes a weighted sum of each expression model 252 based on a set of blend shape weights computed for one or more geometric models 202, as described above in conjunction with FIG. 2. In one embodiment, modeling engine 118 may generate a plurality of different facial regions in the manner shown, and then compute a different weighted combination of expression models 252 for each different facial region.

Procedure for Generating a Prediction Model

Figure 4:
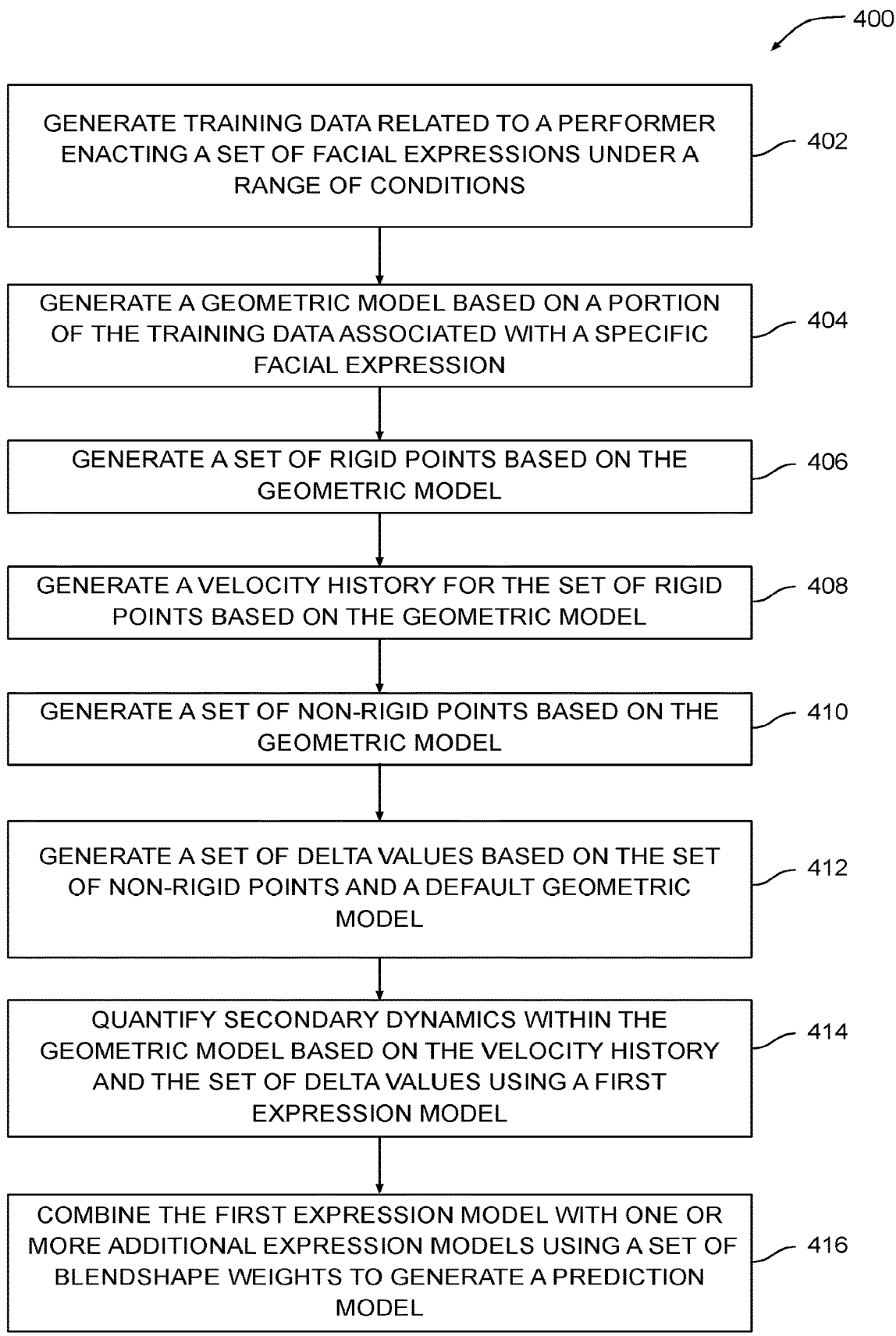
FIG. 4 sets forth a flow diagram of method steps for generating a prediction model for predicting secondary dynamics in facial expressions, according to various embodiments.

FIG. 4 sets forth a flow diagram of method steps for generating a prediction model to remove secondary dynamics from facial expressions in computer animations, according to various embodiments. Although the method steps are described in conjunction with the systems of FIGS. 1-3, persons skilled in the art will understand that any system configured to perform the method steps in any order falls within the scope of the present embodiments. Any one or more of the steps set forth below can be repeated for any different performer 132, any different facial expression enacted by a given performer 132, or any different geometric model associated with a given performer 132.

As shown, a method 400 begins at step 402, where capture devices 136 within motion capture environment 130 generate training data 140 that reflects performer 132 enacting a set of facial expressions under a range of conditions. Motion capture environment 130 includes one or more capture devices 136 that are configured to generate motion capture data 138, which includes training data 140. Motion capture data 138 includes 3D video or other types of motion capture data.

At step 404, geometry modeler 200 within modeling engine 118 generates a geometric model 202 based on a portion of training data 140 associated with a specific facial expression captured at step 402. The geometric model 202 includes 3D geometry that represents the face of performer 132 while performer 132 enacts the specific facial expression while subject to one or more loading conditions. In one embodiment, actuator 134 may be configured to impart oscillatory forces to performer 132 in order to induce secondary dynamics in the face of performer 132.

At step 406, rigid point generator 210 within modeling engine 118 generates a set of rigid points 212 based on the geometric model 202 generated at step 404. Rigid points 212 generally correspond to rigid portions of the face of performer 132, including skeletal regions, skull regions, and other areas where significant secondary dynamics do not occur. In one embodiment, rigid point generator may generate rigid points 212 based on a set of facial features identified within the geometric model 202.

At step 408, velocity history generator 220 within modeling engine 118 generates a velocity history 222 for the set of rigid points based on the geometric model 202. The velocity history 222 indicates the time-varying velocities of rigid points 212. Velocity history generator 220 generates the velocity history 222 by determining differences in the positions of rigid points 212 over a time interval. A given velocity can be expressed as a 3D vector that includes, for example, X, Y, and Z components.

At step 410, non-rigid point generator 230 within modeling engine 118 generates a set of non-rigid points 232 based on the geometric model 202. Non-rigid points 232 generally correspond to flexible portions of the face of performer 132, including soft tissue regions and other areas where secondary dynamics can occur. In one embodiment, non-rigid point generator 230 may generate non-rigid points 232 based on rigid points 212. Steps 410 and/or 412 can occur before, at the same time as, or after steps 406 and/or 408, provided that step 412 occurs after step 410 and step 408 occurs after step 406.

At step 412, delta value generator 240 within modeling engine 118 generates a set of delta values 242 based on the set of non-rigid points 232 and a default geometric model 202 associated with the specific facial expression. The default geometric model 202 is generated to represent the face of performer 132 when performer 132 enacts the specific facial expression in the absence of any loading conditions. A given delta value 242 generally quantifies the degree of secondary dynamics associated with any given non-rigid point 232. In one embodiment, the default geometric model 202 may be generated based on an average of the performance during which performer 132 enacts a given facial expression. Any given geometric model can be computed within the same referential or stabilized space.

At step 414, machine learning engine 250 within modeling engine 118 quantifies secondary dynamics within the geometric model 202 based on the velocity history 222 and the set of delta values 242 using a first expression model 252. The first expression model 252 includes one or more Machine Learning models, such as support vector regressors, among others, that are trained to transform a velocity history 222 into a set of delta values 242. In one embodiment, a given expression model 252 may correspond to a particular dimension associated with a given delta value 242.

At step 416, model compositing engine 260 within modeling engine 118 combines the first expression model 252 with one or more additional expression models 252 based on a set of blendshape weights to generate a prediction model 120. Compositing engine 260 generates the set of blendshape weights based on the performance data. The set of blendshape weights can be generated using any technically feasible approach. Compositing engine 260 may generate a different set of blendshape weights for each different facial region. Compositing engine 260 maps the set of blendshape weights to a set of expression model weights and then combines one or more expression models 252 based on the set of expression model weights. Compositing engine 260 may perform step 418 separately for one or more different facial regions to generate prediction model 120.

Figure 5:
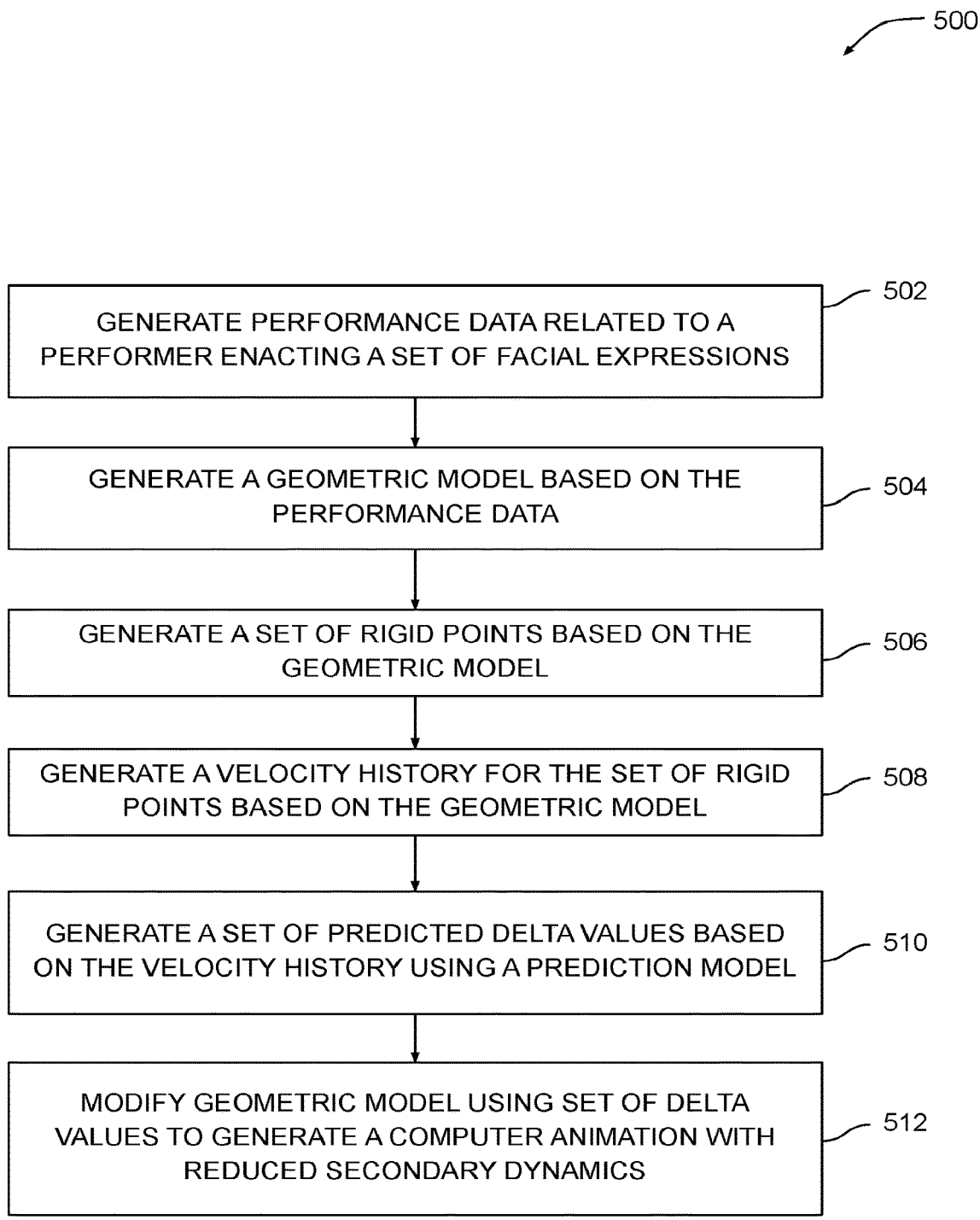
FIG. 5 sets forth a flow diagram of method steps for removing secondary dynamics from facial expressions in computer animations, according to various embodiments.

FIG. 5 sets forth a flow diagram of method steps for removing secondary dynamics from facial expressions in computer animations, according to various embodiments. Although the method steps are described in conjunction with the systems of FIGS. 1-3, persons skilled in the art will understand that any system configured to perform the method steps in any order falls within the scope of the present embodiments.

As shown, a method 500 begins at step 502, where capture devices 136 within motion capture environment 130 generate performance data 142 that reflects performer 132 enacting one or more facial expressions during a performance. Performer 132 may be subject to various types of loading conditions that can induce secondary dynamics in the one or more facial expressions.

At step 504, geometry modeler 200 within modeling engine 118 generates a geometric model 204 that includes 3D geometry representing the face of performer 132 while performer 132 enacts one or more facial expressions. Geometric model 204 may include a triangulated mesh, a 3D point cloud, or any other technically feasible 3D representation.

At step 506, rigid point generator 210 within modeling engine 118 generates a set of rigid points 214 based on the geometric model 204 generated at step 504. Rigid points 214 generally correspond to rigid portions of the face of performer 132, including skeletal regions, skull regions, and other areas where significant secondary dynamics do not occur. In one embodiment, rigid point generator may generate rigid points 214 based on a set of facial features identified within the geometric model 204.

At step 508, velocity history generator 220 within modeling engine 118 generates a velocity history 224 for the set of rigid points based on geometric model 204. The velocity history 224 indicates the time-varying velocities of rigid points 214. Velocity history generator 220 generates the velocity history 224 by determining differences in the positions of rigid points 214 over a time interval, in like fashion as described above in conjunction with step 408 of the method 400.

At step 510, prediction model 120 generates a set of predicted delta values 244 based on the velocity history 224 generated at step 508. Prediction model 120 can be generated by implementing the method 400 described above in conjunction with FIG. 4. Predicted delta values 244 quantify the level of secondary dynamics present in geometrical model 204 and can be used to remove those secondary dynamics.

At step 512, modeling engine 118 modifies geometric model 204 using the set of predicted delta values 244 generated at step 510 to generate a computer animation with reduced secondary dynamics. In one embodiment, modeling engine 118 may generate secondary dynamics using prediction model 120 and then incorporate those secondary dynamics into geometric model 204.

In sum, a modeling engine generates a prediction model configured to quantify and predict secondary dynamics associated with a performer enacting a performance. The modeling engine generates a set of geometric representations that represents the face of the performer enacting different facial expressions under a range of loading conditions. For a given facial expression and specific loading condition, the modeling engine analyzes a corresponding geometric representation to identify a set of rigid points that correspond to skeletal regions of the performer. The modeling engine tracks the positions of these rigid points over time to generate a velocity history for each rigid point. The modeling engine also analyzes the geometric representation to identify a set of non-rigid points that correspond to non-skeletal regions of the performer. The modeling engine compares the positions of the non-rigid points during the specific loading condition to corresponding positions of those non-rigid points in the absence of the specific loading condition to generate a set of delta values. Based on the velocity history generated and delta values, the modeling engine trains an expression model to generate the set of delta values based on the velocity history. The modeling engine repeats these techniques for each facial expression under one or more different loading conditions to generate a different expression model for each facial expression. The modeling engine combines these expression models to generate a prediction model that is broadly applicable across a range of expressions. The prediction model can be used to predict and remove secondary dynamics from a given geometric representation of a performance or generate and add secondary dynamics to a given geometric representation of a performance.

At least one technical advantage of the disclosed techniques relative to the prior art is that the disclosed techniques enable the secondary dynamics associated with the facial expressions made by a performer during a performance to be accurately predicted. Accordingly, the secondary dynamics can be reduced or eliminated in a computer animation of those facial expressions in a more accurate manner relative to prior art approaches, thus resulting in an overall more realistic looking computer animation. These technical advantages represent one or more technological advancements over prior art approaches.

1. Some embodiments include a computer-implemented method for generating computer animations of facial expressions, the method comprising generating a first geometric model of a first facial expression made by a performer during a performance, wherein the first geometric model includes a first level of secondary dynamics, generating a first set of values that correspond to one or more non-rigid portions of a facial area associated with the performer based on a second set of values that correspond to one or more rigid portions of the facial area, correcting the first geometric model based on the first set of values to generate a second geometric model that includes a second level of secondary dynamics, and generating a computer animation that is based on the second geometric model and depicts the first facial expression having the second level of secondary dynamics.

2. The computer-implemented method of clause 1, further comprising generating motion capture data when the performer enacts the first facial expression in a motion capture environment, wherein the first geometric model is generated based on the motion capture data.

3. The computer-implemented method of any of clauses 1-2, further comprising determining a set of locations corresponding to one or more regions of a skull of the performer, and generating the second set of values based on the set of locations.

4. The computer-implemented method of any of clauses 1-3, further comprising determining a set of locations corresponding to one or more regions of facial tissue of the performer, and generating the first set of values based on the set of locations.

5. The computer-implemented method of any of clauses 1-4, wherein a first machine learning model is trained to generate values that correspond to the one or more non-rigid portions of the facial area based on a plurality of velocities associated with the one or more non-rigid portions of the facial area over a time interval.

6. The computer-implemented method of any of clauses 1-5, wherein correcting the first geometric model comprises modifying a position of at least one vertex included in the first geometric model based on a corresponding value included in the first set of values.

7. The computer-implemented method of any of clauses 1-6, further comprising compositing a first machine learning model associated with the first facial expression with a second machine learning model associated with a second facial expression to generate a prediction model that quantifies different secondary dynamics for different facial expressions.

8. The computer-implemented method of any of clauses 1-7, wherein compositing the first machine learning model with the second machine learning model comprises computing a weighted sum of a first output generated by the first machine learning model and a second output generated by the second machine learning model based on a first set of weights.

9. The computer-implemented method of any of clauses 1-8, wherein compositing the first machine learning model with the second machine learning model comprises generating a set of blendshapes corresponding to the second geometric model, generating a set of blendshape weights corresponding to the set of blendshapes, and computing a weighted sum of a first output of the first machine learning model and a second output of the second machine learning model based on the set of blendshape weights.

10. The computer-implemented method of any of clauses 1-9, wherein the first geometric model comprises a triangulated mesh of three-dimensional vertices or a three-dimensional point cloud.

11. Some embodiments include a non-transitory computer-readable medium storing program instructions that, when executed by a processor, cause the processor to generate computer animations of facial expressions by performing the steps of generating a first geometric model of a first facial expression made by a performer during a performance, wherein the first geometric model includes a first level of secondary dynamics, generating a first set of values that correspond to one or more non-rigid portions of a facial area associated with the performer based on a second set of values that correspond to one or more rigid portions of the facial area, correcting the first geometric model based on the first set of values to generate a second geometric model that includes a second level of secondary dynamics, and generating a computer animation that is based on the second geometric model and depicts the first facial expression having the second level of secondary dynamics.

12. The non-transitory computer-readable medium of clause 11, further comprising the steps of capturing motion capture data when the performer enacts the first facial expression in a motion capture environment, wherein the first geometric model is generated based on the motion capture data.

13. The non-transitory computer-readable medium of any of clauses 11-12, further comprising the steps of determining a first set of locations corresponding to the one or more non-rigid portions of the facial area, generating the first set of values based on the first set of locations, determining a second set of locations corresponding to the one or more rigid portions of the facial area based on at least one facial feature associated with the performer, and generating the second set of values based on the second set of locations.

14. The non-transitory computer-readable medium of any of clauses 11-13, wherein a first machine learning model is trained to generate values that correspond to the one or more non-rigid portions of the facial area based on a plurality of velocities associated with a plurality of locations within the one or more non-rigid portions of the facial area over a time interval.

15. The non-transitory computer-readable medium of any of clauses 11-14, further comprising the step of compositing a first machine learning model associated with the first facial expression with a second machine learning model associated with a second facial expressions to generate a prediction model that quantifies different secondary dynamics for different facial expressions.

16. The non-transitory computer-readable medium of any of clauses 11-15, wherein the step of compositing the first machine learning model with the second machine learning model comprises generating a set of blendshapes corresponding to the second geometric model, generating a set of blendshape weights corresponding to the set of blendshapes, and computing a weighted sum of a first output of the first machine learning model and a second output of the second machine learning model based on the set of blendshape weights.

17. The non-transitory computer-readable medium of any of clauses 11-16, wherein a first machine learning model is trained to generate the first set of values based on performance data that is captured when the performer is subjected to a range of loading conditions.

18. The non-transitory computer-readable medium of any of clauses 11-17, wherein the range of loading conditions includes a loading condition corresponding to zero loading.

19. The non-transitory computer-readable medium of any of clauses 11-18, wherein the first set of values corresponds to one or more facial regions of the performer where secondary dynamics occur, and the second set of values corresponds to one or more facial regions of the performer where secondary dynamics do not occur.

20. Some embodiments include a system, comprising a memory storing a software application, and a processor that, when executing the software application, is configured to perform the steps of generating a first geometric model of a first facial expression made by a performer during a performance, wherein the first geometric model includes a first level of secondary dynamics, generating a first set of values that correspond to one or more non-rigid portions of a facial area associated with the performer based on a second set of values that correspond to one or more rigid portions of the facial area, correcting the first geometric model based on the first set of values to generate a second geometric model that includes a second level of secondary dynamics, and generating a computer animation that is based on the second geometric model and depicts the first facial expression having the second level of secondary dynamics.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating computer animations of facial expressions, the method comprising:
    receiving training data associated with a performer enacting one or more facial expressions;
    generating a first geometric model of a first facial expression included in the one or more facial expressions based on the training data;
    generating a first set of values that correspond to one or more non-rigid portions of the face of the performer based on the first geometric model;
    generating a second set of values that correspond to one or more rigid portions of the face of the performer based on the first geometric model; and
    training a first expression model associated with the first facial expression based on the first set of values and the second set of values, wherein the first expression model is usable to generate, based on a third set of values that correspond to the one or more rigid portions, predicted secondary dynamics that are associated with the first facial expression and are caused by one or more forces applied to the performer.

2. The computer-implemented method of claim 1, wherein generating the first set of values comprises identifying a plurality of non-rigid points included in the first geometric model that correspond to the one or more non-rigid portions of the face of the performer.

3. The computer-implemented method of claim 2, wherein generating the first set of values further comprises comparing the plurality of non-rigid points with a plurality of points included in a default geometric model associated with the performer.

4. The computer-implemented method of claim 1, wherein generating the second set of values comprises identifying a plurality of rigid points included in the first geometric model that correspond to the one or more rigid portions of the face of the performer.

5. The computer-implemented method of claim 4, wherein generating the second set of values further comprises determining, for each rigid point included in the plurality of rigid points, one or more positions of the rigid point over an interval of time.

6. The computer-implemented method of claim 1, wherein the first expression model is trained to receive a set of velocity values associated with the one or more rigid portions and generate a set of delta values associated with the one or more non-rigid portions.

7. The computer-implemented method of claim 1, further comprising generating a first prediction model based on the first expression model, wherein the first prediction model is configured to quantify different secondary dynamics for different facial expressions.

8. The computer-implemented method of claim 7, wherein generating the first prediction model comprises generating a set of blendshape weights based on at least the first geometric model.

9. The computer-implemented method of claim 1, further comprising:
    generating a second geometric model of a second facial expression included in the one or more facial expressions based on the training data;
    generating a fourth set of values that correspond to the one or more non-rigid portions of the face of the performer based on the second geometric model;
    generating a fifth set of values that correspond to the one or more rigid portions of the face of the performer based on the second geometric model; and
    training a second expression model associated with the second facial expression based on the fourth set of values and the fifth set of values, wherein the second expression model is usable to predict an amount of secondary dynamics associated with the second facial expression.

10. The computer-implemented method of claim 9, further comprising generating a first prediction model based on the first expression model and the second expression model, wherein the first prediction model is configured to quantify different secondary dynamics for different facial expressions.

11. One or more non-transitory computer-readable medium including instructions that, when executed by one or more processors, cause the one or more processors to perform the steps of:
    receiving training data associated with a performer enacting one or more facial expressions;
    generating a first geometric model of a first facial expression included in the one or more facial expressions based on the training data;
    generating a first set of values that correspond to one or more non-rigid portions of the face of the performer based on the first geometric model;
    generating a second set of values that correspond to one or more rigid portions of the face of the performer based on the first geometric model; and
    training a first expression model associated with the first facial expression based on the first set of values and the second set of values, wherein the first expression model is usable to generate, based on a third set of values that correspond to the one or more rigid portions, predicted secondary dynamics that are associated with the first facial expression and are caused by one or more forces applied to the performer.

12. The one or more non-transitory computer-readable medium of claim 11, wherein generating the first set of values comprises identifying a plurality of non-rigid points included in the first geometric model that correspond to the one or more non-rigid portions of the face of the performer.

13. The one or more non-transitory computer-readable medium of claim 12, wherein generating the first set of values further comprises comparing the plurality of non-rigid points with a plurality of points included in a default geometric model associated with the performer.

14. The one or more non-transitory computer-readable medium of claim 11, wherein generating the second set of values comprises identifying a plurality of rigid points included in the first geometric model that correspond to the one or more rigid portions of the face of the performer.

15. The one or more non-transitory computer-readable medium of claim 14, wherein generating the second set of values further comprises determining, for each rigid point included in the plurality of rigid points, one or more positions of the rigid point over an interval of time.

16. The one or more non-transitory computer-readable medium of claim 11, wherein the first expression model predicts an amount of secondary dynamics associated with the first facial expression in a first dimension, and the instructions, when executed by the one or more processors, further cause the one or more processors to perform the step of training a second expression model based on the first set of values and the second set of values, wherein the second expression model is usable to predict an amount of secondary dynamics associated with the first facial expression in a second dimension.

17. The one or more non-transitory computer-readable medium of claim 11, wherein the instructions, when executed by the one or more processors, further cause the one or more processors to perform the steps of:
    training a second expression model based on the training data, wherein the second expression model is usable to predict an amount of secondary dynamics associated with a second facial expression included in the one or more facial expressions; and
    combining the first expression model and the second expression model to generate a first prediction model, wherein the first prediction model is configured to quantify different secondary dynamics for different facial expressions.

18. The one or more non-transitory computer-readable medium of claim 17, wherein combining the first expression model and the second expression model comprises generating a first set of weights associated with the first expression model and a second set of weights associated with the second expression model.

19. The one or more non-transitory computer-readable medium of claim 17, wherein combining the first expression model and the second expression model comprises generating one or more sets of weights based on the training data, wherein each set of weights is associated with a different facial region of the face of the performer.

20. A system comprising:
one or more memories storing instructions; and
one or more processors that are coupled to the one or more memories and, when executing the instructions, are configured to:
receive training data associated with a performer enacting one or more facial expressions;
generate a first geometric model of a first facial expression included in the one or more facial expressions based on the training data;
generate a first set of values that correspond to one or more non-rigid portions of the face of the performer based on the first geometric model;
generate a second set of values that correspond to one or more rigid portions of the face of the performer based on the first geometric model; and
train a first expression model associated with the first facial expression based on the first set of values and the second set of values, wherein the first expression model is usable to generate, based on a third set of values that correspond to the one or more rigid portions, predicted secondary dynamics that are associated with the first facial expression and are caused by one or more forces applied to the performer.

* * * * *